(12) United States Patent
Wustman et al.

(10) Patent No.: US 6,929,825 B2
(45) Date of Patent: Aug. 16, 2005

(54) METHOD FOR ALUMINIDE COATING OF GAS TURBINE ENGINE BLADE

(75) Inventors: Roger Dale Wustman, Mason, OH (US); William Scott Walston, Mason, OH (US); Matthew David Saylor, Blanchester, OH (US); Brian Harvey Pilsner, Mason, OH (US); Jeffrey Allan Pfaendtner, Blue Ash, OH (US)

(73) Assignee: General Electric Company, Schenectady, NY (US)

( * ) Notice: Subject to any disclaimer, the term of this patent is extended or adjusted under 35 U.S.C. 154(b) by 284 days.

(21) Appl. No.: 10/357,987

(22) Filed: Feb. 4, 2003

(65) Prior Publication Data

US 2004/0151836 A1 Aug. 5, 2004

(51) Int. Cl.[7] ............................................. C23C 16/06
(52) U.S. Cl. ..................... 427/250; 427/237; 427/239
(58) Field of Search ............................... 427/250, 237, 427/239

(56) References Cited

U.S. PATENT DOCUMENTS

| | | | |
|---|---|---|---|
| 4,132,816 A | | 1/1979 | Benden et al. |
| 4,148,275 A | | 4/1979 | Benden et al. |
| 4,332,843 A | | 6/1982 | Ahuja |
| 4,714,624 A | | 12/1987 | Naik |
| 5,221,354 A | | 6/1993 | Rigney |
| 5,264,245 A | * | 11/1993 | Punola et al. ............... 427/237 |
| 5,407,704 A | | 4/1995 | Basta et al. |
| 5,462,013 A | | 10/1995 | Punola et al. |
| 5,928,725 A | * | 7/1999 | Howard et al. ............. 427/237 |
| 6,039,810 A | | 3/2000 | Mantkowski et al. |
| 6,110,262 A | * | 8/2000 | Kircher et al. .......... 106/14.44 |
| 6,203,851 B1 | | 3/2001 | Walter |
| 6,207,233 B1 | | 3/2001 | Perry et al. |
| 6,224,941 B1 | * | 5/2001 | Chen et al. ................. 427/252 |
| 6,273,678 B1 | | 8/2001 | Darolia |
| 6,283,714 B1 | | 9/2001 | Rigney et al. |
| 6,296,447 B1 | | 10/2001 | Rigney et al. |
| 6,332,926 B1 | | 12/2001 | Pfaendtner et al. |
| 6,383,306 B1 | * | 5/2002 | Spitsberg et al. ........... 148/208 |
| 6,413,584 B1 | | 7/2002 | Wustman et al. |
| 6,434,876 B1 | * | 8/2002 | Wheat et al. ............... 427/203 |
| 6,485,262 B1 | * | 11/2002 | Heyward et al. ......... 416/97 R |
| 6,497,920 B1 | * | 12/2002 | Pfaendtner et al. ......... 427/235 |
| 6,533,875 B1 | * | 3/2003 | Pfaendtner et al. ......... 148/535 |
| 6,616,969 B2 | * | 9/2003 | Pfaendtner et al. ......... 427/237 |
| 2001/0055650 A1 | | 12/2001 | Pfaendtner et al. |

FOREIGN PATENT DOCUMENTS

| | | |
|---|---|---|
| EP | 0 480 867 A | 4/1992 |
| EP | 0 731 187 A | 9/1996 |
| EP | 1 076 111 A | 2/2001 |
| WO | WO 01/98561 A | 12/2001 |

* cited by examiner

Primary Examiner—Bret Chen
(74) Attorney, Agent, or Firm—Donald E. Hasse; Hasse & Nesbitt LLC (57) ABSTRACT

A method for applying an aluminide coating on a gas turbine engine blade having an external surface and an internal cooling cavity having an internal surface that is connected to the external surface by cooling holes. The method is conducted in a vapor coating container having a hollow interior coating chamber, and includes the steps of loading the coating chamber with the blade to be coated; providing an aluminide coating gas in the loaded coating chamber; flowing an inert carrier gas into the loaded coating chamber comprising the aluminide coating gas at a specified gas flow rate and time to move the aluminide coating gas through the cooling holes and internal cooling cavity and deposit an aluminide coating on the internal surface of the blade; and then flowing an inert carrier gas into the loaded coating chamber comprising the aluminide coating gas at a specified higher temperature and time to deposit an aluminide coating on the external surface of the blade.

30 Claims, 3 Drawing Sheets

METHOD FOR ALUMINIDE COATING OF GAS TURBINE ENGINE BLADE

BACKGROUND OF THE INVENTION

The present invention relates to a method for applying a protective coating on a gas turbine engine blade having an internal cooling cavity. More particularly, the invention relates to the aluminide coating of the internal and external surfaces of such a gas turbine blade.

In an aircraft gas turbine engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against the airfoil section of the turbine blades, which turns the shaft and provides power to the compressor. (As used herein, the term turbine blade may refer to either a turbine blade or a turbine vane, which have similar appearance in pertinent portions.) The hot exhaust gases flow from the back of the engine, driving it and the aircraft forward.

The hotter the combustion and exhaust gases, the more efficient is the operation of the jet engine. The maximum temperature of the combustion gases is usually limited by the materials used to fabricate the turbine blades. In current engines, the turbine blades are made of nickel-based superalloys, and can operate at metal temperatures of up to about 1900–2100° F. (about 1038–1149° C.).

Turbine blades typically comprise cooling circuits that channel cooling air through the interior of the turbine airfoil to reduce temperatures encountered by the blade and improve part life. During operation of the jet engine, air is forced through the root portion of the blade, into the airfoil cooling chambers, and out openings at the external surface of the airfoil. The flow of the air removes heat from the interior of the airfoil and, in some cases, providing a boundary layer of cooler air at the surface of the airfoil. In at least some known blades, an abrupt transition extends between the root portion and the airfoil portion to increase the volume of cooling air entering the airfoil portion.

Gas turbine blades frequently have metallic surface coatings that are capable of resisting the oxidation, corrosion and sulfidation conditions generated during high temperature operation. Such coatings facilitate the airfoil withstanding thermal stresses that may be induced within the higher operating temperature areas of the blade. However, if the coating is applied at too great a thickness on regions of the blade operating at lower temperatures, such as the root and shank region, the combination of the increased coating thickness and the abrupt transition within the dovetail may cause cracking in the root portion as higher stresses are induced into the transition area of the dovetail. Over time, continued operation may lead to a premature failure of the blade within the engine.

The above coatings can be applied by depositing a vapor of one or more protective metals, for example aluminum or alloys of aluminum, on blade surfaces at high temperatures within a coating container or chamber commonly referred to as a "retort". Generally, the blades to be coated are placed within the container, along with a source of the aluminide coating, typically in the form of metallic pellets retained in perforated baskets arranged in rows surrounding the blades. The coating container is then placed within a heater such as a furnace to generate an aluminide coating vapor. Generation of the coating vapor typically includes the use of halide "activators" such as fluorides, chlorides or bromides. The halide activator can be in the form of a gas that is introduced into the container to react with the source of the aluminide coating and form an aluminide-bearing gas, or it can be generated from a halide activator source within the container that forms a reactive halide gas upon heating.

The aluminide-bearing gas is typically transported or moved within the coating container by a nonoxidizing or inert carrier gas (e.g., hydrogen, nitrogen, helium or argon). In some vapor coating systems, this carrier gas is introduced through the bottom of the container and carries the aluminide-bearing gas upward to coat the blades. See, for example, U.S. Pat. No. 4,148,275 (Benden et al), issued Apr. 10, 1979; and U.S. Pat. No. 5,928,725 (Howard et al), issued Jul. 27, 1999. In other vapor coating systems, the carrier gas is introduced through the top of the coating container and diffuses throughout the container to carry the aluminide-bearing gas and coat the blades. See U.S. Pat. No. 6,039,810 (Mantkowski et al), issued Mar. 21, 2000.

It is desirable that a controlled, relatively uniform aluminide coating be applied to the external and internal surfaces of the turbine blades. It is also desirable that the aluminide coating applied to internal surfaces of the blades, particularly in the root and shank region, be relatively thin (for example, having a thickness of from about 0.0005 to about 0.0015 inches) (from about 12.7 to about 38.1 microns) so as not to cause premature cracking in the root portion of the blade.

BRIEF DESCRIPTION OF THE INVENTION

In one aspect, this invention relates to a method for applying an aluminide coating on a gas turbine engine blade having an external surface and an internal cooling cavity defined by an internal surface that is connected to the external surface by cooling holes, the method being conducted in a vapor coating container having a hollow interior coating chamber, the method comprising the steps of:

(a) loading the coating chamber with the blade to be coated;

(b) providing an aluminide coating gas in the loaded coating chamber;

(c) flowing an inert carrier gas into the loaded coating chamber comprising the aluminide coating gas at a gas flow rate of from about 60 to about 150 ft.$^3$/hour (from about 1699 to about 4248 liters/hour) for from about 2 to about 6 hours to move the aluminide coating gas through the cooling holes and internal cooling cavity of the blade, while maintaining the loaded coating chamber at a temperature of from about 815 to about 980° C., to deposit an aluminide coating on the internal surface of the blade; and then (d) flowing an inert carrier gas into the loaded coating chamber comprising the aluminide coating gas at a gas flow rate of from 0 to about 150 ft.$^3$/hour (from 0 to about 4248 liters/hour) for from about 2 to about 6 hours, while maintaining the loaded coating chamber at a temperature of from about 1040 to about 1125° C., to deposit an aluminide coating on the external surface of the blade.

In another aspect, this invention relates to a method for applying an aluminide coating on a gas turbine engine blade having an external surface and an internal cooling cavity defined by an internal surface that is connected to the external surface by cooling holes, the method being conducted in a vapor coating container having a hollow interior coating chamber, the method comprising the steps of:

(a) loading the coating chamber with the blade to be coated;

(b) providing an aluminide coating gas in the loaded coating chamber;

(c) flowing an inert carrier gas into the loaded coating chamber comprising the aluminide coating gas at a gas flow rate of from about 80 to about 140 ft.³/hour (from about 2265 to about 3964 liters/hour) for from about 3 to about 5 hours to move the aluminide coating gas through the cooling holes and internal cooling cavity of the blade, while maintaining the loaded coating chamber at a temperature of from about 850 to about 950° C., to deposit an aluminide coating having a thickness of from about 0.0005 to about 0.0015 inches (from about 12.7 to about 38.1 microns) on the internal surface of the blade; and then (d) flowing an inert carrier gas into the loaded coating chamber comprising the aluminide coating gas at a gas flow rate of from about 30 to about 120 ft.³/hour (from about 850 to about 3398 liters/hour) for from about 2.5 to about 5 hours, while maintaining the loaded coating chamber at a temperature of from about 1050 to about 1110° C., to deposit an aluminide coating, having a thickness of from about 0.0015 to about 0.003 inches (from about 38.1 to about 76.2 microns), on the external surface of the blade in the airfoil body portion.

DETAILED DESCRIPTION OF THE INVENTION

Figure 1:
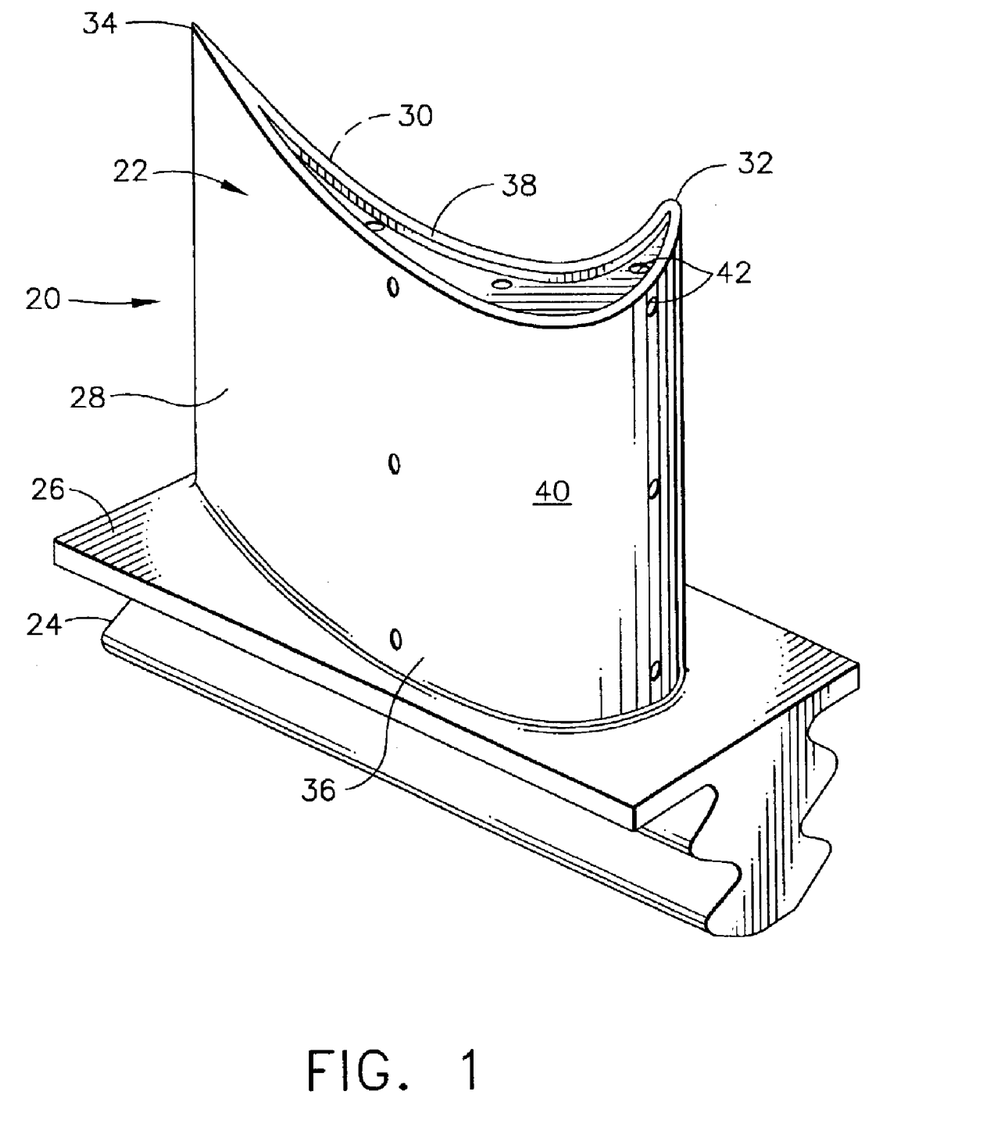
FIG. 1 is a perspective view of a gas turbine engine blade.

Referring to the drawings, FIG. 1 depicts a turbine blade 20 of a gas turbine engine. Turbine blade 20 may be formed of any operable material, but typically is a nickel-base superalloy. Blade 20 includes an airfoil 22 against which the flow of hot exhaust gas is directed. Blade 20 is mounted to a turbine disk (not shown) by a dovetail 24 that extends downwardly from the airfoil 22 and engages a slot on the turbine disk. A platform 26 extends longitudinally outwardly from the area where the airfoil 22 is joined to the dovetail 24.

Airfoil 22 includes a first sidewall 28 and a second sidewall 30. First sidewall 28 is convex and defines a suction side of airfoil 22, and second sidewall 30 is concave and defines a pressure side of airfoil 22. Sidewalls 28 and 30 are joined at a leading edge 32 and at an axially-spaced trailing edge 34 of airfoil 22. Airfoil trailing edge 34 is spaced chordwise and downstream from airfoil leading edge 32. First and second sidewalls 28 and 30, respectively, extend longitudinally or radially outward in span from an airfoil root 36 positioned adjacent dovetail 24, to an oppositely disposed airfoil tip 38 remote from dovetail 24. Airfoil tip 38 defines a radially outer boundary of an internal cooling cavity (not shown in FIG. 1). The cooling cavity is bounded within airfoil 22 between sidewalls 28 and 30. More specifically, blade 20 includes an internal surface (not shown in FIG. 1) and an external surface 40, and the cooling cavity is defined by the blade internal surface. In one embodiment, a number of internal cooling chambers extend through the interior of airfoil 22, between airfoil first and second sidewalls 28 and 30, respectively, ending in a plurality of cooling holes 42 extending between the airfoil internal surface and airfoil external surface 40. During operation of the gas turbine engine, a flow of cooling air is directed through the internal cooling chambers to reduce the temperature of the airfoil 22.

Figure 2:
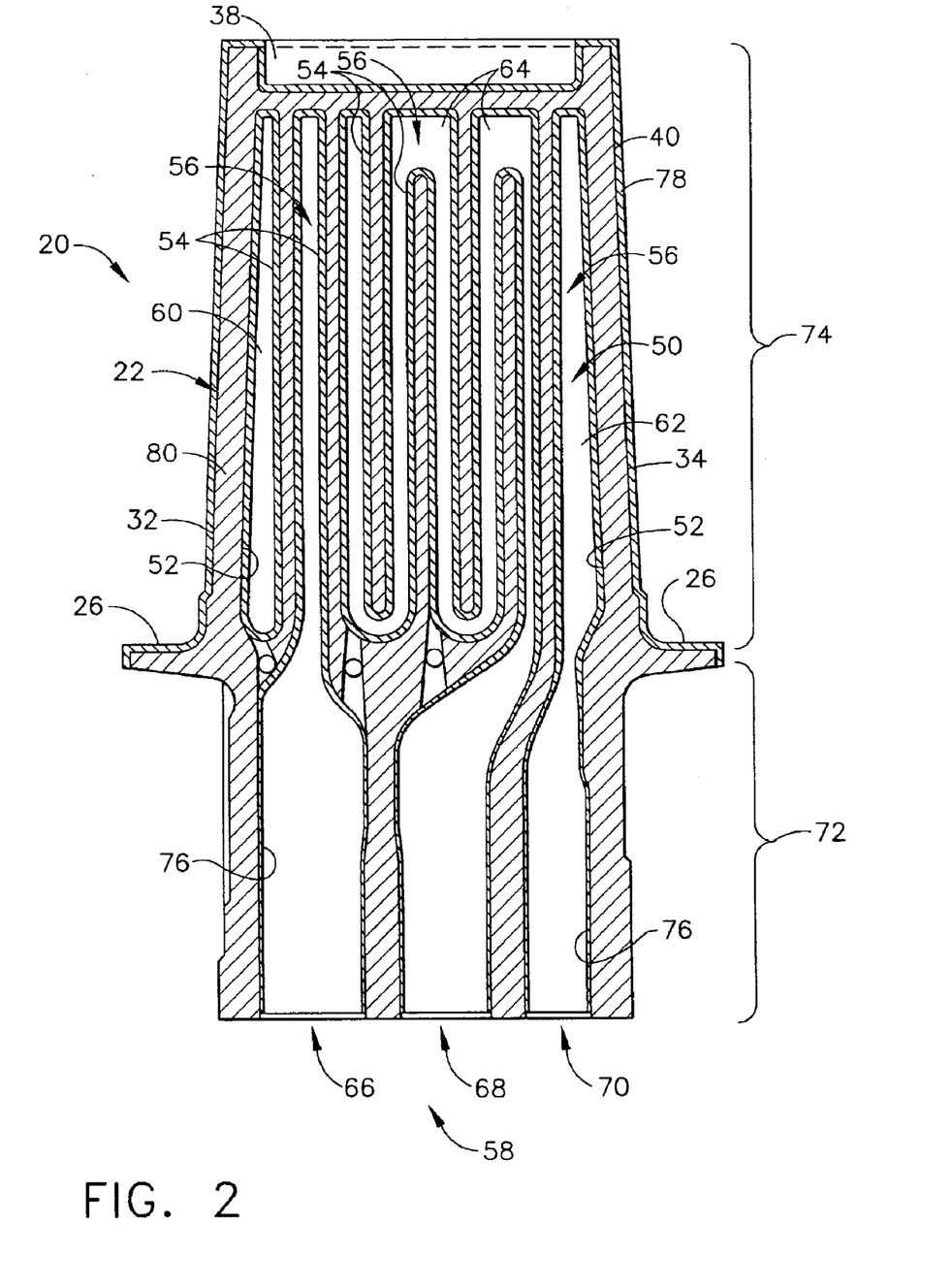
FIG. 2 is an exemplary cross-sectional view of the turbine blade shown in FIG. 1.

FIG. 2 is an exemplary cross-sectional view of blade 20 including airfoil 22. Blade 20 includes a cooling cavity 50 defined by an internal surface 52 of blade 20. Cooling cavity 50 includes a plurality of inner walls 54 that separate cooling cavity 50 into a plurality of cooling chambers 56. The geometry and interrelationship of chambers 56 to walls 54 varies with the intended use of blade 20. In one embodiment, inner walls 54 are cast integrally with airfoil 22. Cooling chambers 56 are supplied cooling air through a plurality of cooling circuits 58. More specifically, in the exemplary embodiment, airfoil 22 includes a forward cooling chamber 60, an aft cooling chamber 62, and a plurality of mid cooling chambers 64.

Forward cooling chamber 60 extends longitudinally or radially through airfoil 22 to airfoil tip 38, and is bordered by airfoil first and second sidewalls 28 and 30, respectively (shown in FIG. 1), and by airfoil leading edge 32. Forward cooling chamber 60 is cooled with cooling air supplied by a forward cooling circuit 66, which cooling air is fed through cross-over holes (not shown) in the inner wall 54 on the trailing edge side of forward cooling chamber 60.

Mid cooling chambers 64 are between forward cooling chamber 60 and aft cooling chamber 62, and are supplied cooling air by a mid cooling circuit 68. More specifically, mid cooling chambers 64 are in flow communication and form a serpentine cooling passageway. Mid cooling chambers 64 are bordered by airfoil first and second sidewalls 28 and 30, respectively (shown in FIG. 1), and by airfoil tip 38.

Aft cooling chamber 62 extends longitudinally or radially through airfoil 22 to airfoil tip 38, and is bordered by airfoil first and second sidewalls 28 and 30, respectively (shown in FIG. 1), and by airfoil trailing edge 34. Aft cooling chamber 62 is cooled with cooling air supplied by an aft cooling circuit 70 that defines a radially outer boundary of aft cooling chamber 62. In one embodiment, airfoil 22 includes a plurality of trailing edge openings (not shown) that extend between external surface 40 and internal surface 52.

Blade 20 also includes a root portion 72 and an airfoil body portion 74. Root portion 72 is bounded by airfoil root 36 (shown in FIG. 1) and extends through a portion of dovetail 24 (shown in FIG. 1). Airfoil body portion 74 is in flow communication with root portion 72 and extends from root portion 72 to airfoil tip 38. In one embodiment, portions of cooling cavity 50 extending through root portion 72 are known as root passages.

Blade internal surface 52 is coated with a layer of an aluminide coating 76. In one embodiment, the aluminide coating is applied by depositing aluminum onto the internal surface 52, so that a body of blade 20 serves as a substrate 80, by a vapor phase aluminide deposition process. The aluminide coating may be modified with elements such as hafnium, zirconium, yttrium, silicon, titanium, tantalum, cobalt, chromium, platinum, and palladium, and combinations thereof, to improve its corrosion resistance and other properties. The aluminum (and modifying elements, if any) is interdiffused with the material of the substrate 80 to form the aluminide coating 76 on the internal surface 52. The aluminide coating 76 has a composition with the aluminum concentration highest near the internal surface 52, and decreasing aluminum concentration with increasing distance into the substrate 80 from the internal surface 52. More specifically, the thickness of the aluminide coating 76 on internal surface 52 is less than about 0.003 inches (less than about 76.2 microns), typically from about 0.001 inches to about 0.0015 inches (from about 25.4 to about 38.1 microns), within airfoil body portion 74, and less than about 0.0015 inches (less than about 38.1 microns), typically from about 0.0005 to about 0.0015 inches (from about 12.7 to about 38.1 microns), within root portion 72, which operates at a lower temperature in comparison to airfoil body portion 74. In one embodiment, the thickness of the aluminide coating 76 is less than about 0.001 inches (less than about 25.4 microns) within root portion 72. When exposed to a high-temperature oxidizing environment, the aluminum-enriched layer at the internal surface 52 oxidizes to form an adherent aluminum oxide protective scale at the internal surface 52, inhibiting and slowing further oxidation damage.

A layer of aluminide coating 78 is also present on the external surface 40 in the airfoil body portion 74. The aluminide coating is formed by depositing aluminum onto the external surface 40 in the airfoil body portion 74, so that a body of the airfoil 22 serves as a substrate 80, by a vapor phase aluminide deposition process. The aluminide coating may be modified with elements such as described above to improve corrosion resistance and other properties. The aluminum (and modifying elements, if any) is interdiffused with the material of the substrate 80 to form the aluminide coating 78 on the external surface 40. The aluminide coating 78 has a composition with the aluminum concentration highest near the external surface 40, and decreasing aluminum concentration with increasing distance into the substrate 80 from the external surface 40. The aluminide coating 78 is typically from about 0.0005 to about 0.004 inches (from about 12.7 to about 101.6 microns) thick, more typically from about 0.0015 to about 0.003 inches (from about 38.1 to about 76.2 microns) thick on external surface 40 in the airfoil body portion 74. When exposed to a high-temperature oxidizing environment, the aluminum-enriched layer at the external surface 40 oxidizes to form an adherent aluminum oxide protective scale at the external surface 40, inhibiting and slowing further oxidation damage.

An overlay protective coating may be deposited overlying and contacting the external surface 40 of the airfoil body portion 74. The protective coating may be of the MCrAlX type known in the art. The protective layer is usually from about 0.003 to about 0.007 inches (from about 76.2 to about 177.8 microns) thick, typically about 0.005 inches (about 127 microns) thick. The protective layer is deposited by any operable technique, such as physical vapor deposition (e.g., sputtering, cathodic arc, ion plasma, electron beam) or thermal spray.

The overall protective coating optionally includes a ceramic layer deposited overlying and contacting the protective layer. The ceramic layer is usually from about 0.003 to about 0.010 inches (from about 76.2 to about 254 microns) thick, typically about 0.005 inches (about 127 microns) thick. The ceramic layer is usually yttria-stabilized zirconia, which is zirconium oxide comprising from about 2 to about 12 weight percent, typically from about 3 to about 8 weight percent, yttrium oxide. It may be deposited by any operable technique, such as physical vapor deposition or thermal spray. Other operable ceramic materials may be used as well.

During engine operation, cooling air is supplied into airfoil 22 through cooling circuits 58. In one embodiment, cooling air is supplied into airfoil 22 from a compressor. Cooling air entering root portion 72 is channeled into cooling chambers 56 and airfoil body portion 74. Because hot combustion gases impinge upon airfoil body portion 74, the operating temperature of airfoil body portion 74 typically increases to a higher temperature than that associated with root portion 72. The aluminide coating facilitates reducing oxidation of external surface 40 and internal surface 52 in the airfoil body portion 74 despite the increased operating temperature.

Furthermore, stresses generated during engine operation may be induced into root portion 72. Limiting the thickness of the aluminide coating to less than about 0.0015 inches (about 38.1 microns) on internal surface 52 within root portion 72 facilitates preventing material degradation and cracking within root portion 72, thereby maintaining the fatigue life of blade 20. More specifically, limiting cracking of the aluminide coating within root portion 72 facilitates maintaining fatigue life within root portion 72, and thus extends the useful life of blade 20.

Figure 3:
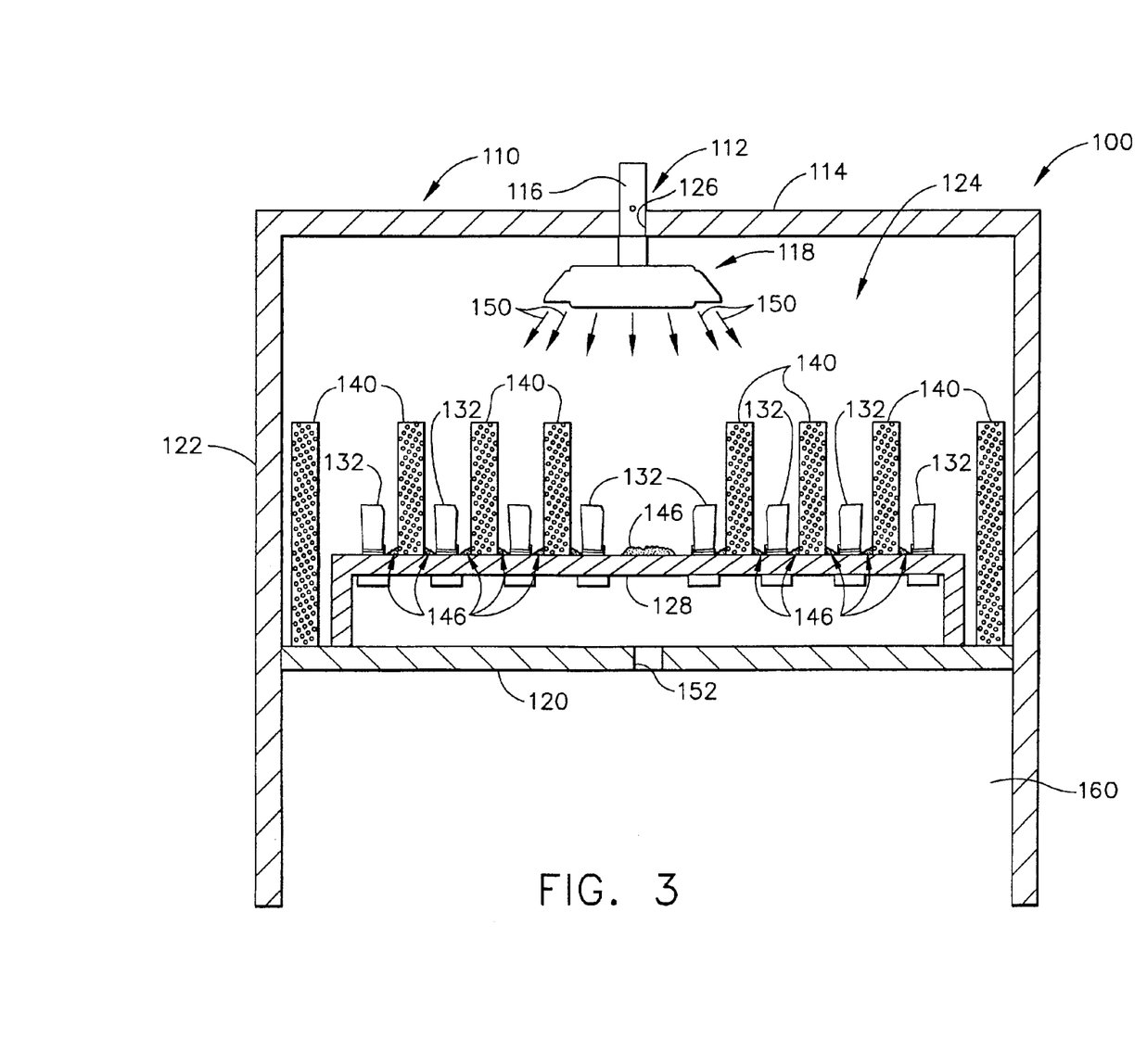
FIG. 3 is sectional side view of an embodiment of a vapor coating apparatus for coating turbine blades such as in FIG. 1.

FIG. 3 illustrates a typical vapor coating apparatus useful for applying an aluminide coating to gas turbine engine blades such as shown in FIG. 1. The vapor coating apparatus is indicated generally as 100, and includes a generally cylindrical coating container indicated as 110. As shown in FIG. 3, a gas distributor 112 (including a pipe 116 for receiving inert gas from a source of supply, and a manifold 118) is sized to fit within container 110. Container 110 has a top or lid indicated as 114, a base indicated as 120 spaced from lid 114, and a generally cylindrical circumferential side wall indicated as 122 that connects lid 114 and base 120 and extends downwardly beyond base 120. Lid 114, base 120 and side wall 122 of container 110 define an interior coating chamber indicated as 124. As also shown in FIG. 3, pipe 116 of distributor 112 is inserted partially through a hole or aperture 126 at or proximate to the center of lid 114. Manifold 118 is positioned within chamber 124 at or proximate to the top thereof, i.e., proximate to lid 114.

Apparatus 100 also has an article support or holder 128 attached to or otherwise associated with base 120 of container 110 that is provided with apertures, typically in the form of slots (not shown) or other suitable devices, for receiving and holding the turbine blades 132 to be coated. Prior to coating blades 132 with the aluminide coating, it may be desirable to mask those areas not requiring any coating. For example, all or part of the external surface in the root portion of the blade may be masked. Apparatus 100 also has holders in the form of perforated baskets indicated as 140 positioned within container 110 for receiving or holding pellets of the aluminum coating source material. As shown in FIG. 3, baskets 140 and blades 132 are below manifold 118 of distributor 112. The number and spacing of baskets 140 and blades 132 can be varied depending upon the internal dimensions and configuration of container 110, the size of blades 132 to be coated and like factors known to those skilled in the art. For example, the blades 132 and baskets 140 may be arranged in alternating concentric rows or circles. The spacing of the blades 132 and baskets 140 should be such as to allow the free flow of gas therebetween. Between each row of blades 132 and baskets 140 is typically placed discrete portions of a powdered halide activator indicated generally as 146. This powdered halide activator is typically placed so as not to touch or be in contact with blades 132 or baskets 140.

After loading holder 128 with the blades 132, the container 110 and its contents, including the aluminum coating source (e.g., aluminum pellets) loaded into baskets 140, are sealed and loaded into a furnace or other heating device. Pipe 116 typically is then connected to a source of a nonoxidizing or inert carrier gas such as hydrogen, nitrogen, helium, or argon. The loaded coating container 110 is then heated to a temperature in the range of from about 815 to about 980° C. (from about 1499 to about 1796° F.), typically from about 850 to about 950° C. (from about 1562 to about 1742° F.), more typically from about 880 to about 920° C.

(about 1616 to about 1688° F.). The particular temperature selected will depend on the coating application parameters desired (including the source of aluminide coating used) and other factors that would be understood by those skilled in the art. At these temperatures, the powdered activator 146 will form a reactive halide gas. Suitable halide activators can be selected from aluminum chloride, aluminum fluoride, aluminum bromide, ammonium chloride, ammonium fluoride, ammonium bromide, and mixtures thereof. Hydrogen chloride (a gas in its standard state) may also be used as the halide activator herein. The reactive halide gas flows through the pellets in baskets 140 comprising the aluminide coating source (e.g., aluminum source) and reacts with the aluminum source to provide the aluminide coating gas, typically in the form of an aluminum halide gas. The aluminum source can be any aluminum or aluminum alloy, for example, cobalt aluminum alloys (CoAl), iron aluminum alloys (FeAl), or chromium aluminum alloys (CrAl), typically in powder or pelletized form. In an alternative embodiment, the reactive halide gas may be flowed into the loaded coating container through one or more pipes (such as pipe 116), instead of being generated within the coating container as described above. In another embodiment, the aluminide coating gas may be generated in a reactor eternal to the coating container, and then flowed into the loaded coating container through one or more pipes. As would be understood by those skilled in the art, the reaction kinetics controlling the rate of formation of the aluminide coating gas will be dependent on the temperature, as well as the rate at which any carrier gas is introduced into chamber 124 by distributor 112, which is the driving force for moving the aluminide coating gas within chamber 124, as well as amongst, around and through blades 132.

To deposit an aluminide coating on the internal surface of blades 132, interior chamber 124 is purged of air by introducing the nonoxidizing or inert carrier gas, such as argon or hydrogen, through pipe 116. This carrier gas then flows into manifold 118, which has a configuration similar to a "shower head" in that it comprises a plurality of gas outlet holes (not shown) spaced along the periphery of a cylindrical or disk-shaped head. The carrier gas exits through the outlet holes as gas streams 150 so as to provide an inert gas atmosphere. The rate at which the carrier gas flows into pipe 116 (and out of the outlet holes as gas streams 150) of manifold 118 is in the range of from about 60 to about 150 ft.$^3$/hour (about 1699 to about 4248 liters/hour), usually from about 80 to about 140 ft$^3$/hour (about 2265 to about 3964 liters/hour), and typically from about 100 to about 130 ft$^3$/hour (about 2832 to about 3681 liters/hour). As the gas exits the outlet holes, each gas stream 150 is directed in a downward path so that the inert carrier gas swirls above the concentric rows of baskets 140 and blades 132, thus creating a relatively uniform and homogeneous atmosphere in chamber 124. In addition, the pressure of the gas flow forces the streams 150 of the carrier gas downwardly from distributor 112 and around and through the rows of baskets 140 and blades 132.

In order to force the aluminide coating gas through the rows of blades 132, the carrier gas applies a certain minimum pressure. This is typically achieved by having the carrier gas continue to flow into chamber 124 at the previously indicated flow rates through pipe 116. Thus, the carrier gas can be used to control the uniformity of the aluminide coating gas environment, and hence reduction of the aluminide coating gas at the surface (exterior and interior), and to provide the necessary pressure to move and force the aluminide coating gas through the rows of blades 132 and into the interior of blades 132, thereby coating them. In particular, the inert carrier gas commingles and mixes with the aluminide coating gas and acts to aid in the coating of external and internal surfaces of blades 132. The inert carrier gas is flowed into the loaded coating chamber at the above rates for a period of time ranging from about 2 to about 6 hours, typically from about 3 to about 5 hours, more typically from about 3.5 to about 4.5 hours, to move the aluminide coating gas through the cooling holes and the internal cooling cavity of the blades, while maintaining the loaded coating chamber at a temperature within the about 815 to about 980° C. range.

As the aluminide coating gas flows over the surface of blades 132, the aluminide coating gas is reduced to aluminum which is deposited on and diffuses into the substrate, thereby forming an aluminide coating on the internal surfaces of blades 132. Within the above time and temperature ranges, the aluminide coating on the internal surface of the blades 132 has a thickness of less than about 0.003 inches (less than about 76.2 microns), typically from about 0.0005 to about 0.0015 inches (from about 12.7 to about 38.1 microns). After passing through blades 132, the remaining aluminide coating gas is exhausted from chamber 124 through gas exhaust outlet indicated as 152 and into an open evacuation chamber or area indicated as 160 defined by the extension of side wall 122 beyond base 120.

To deposit an aluminide coating on the external surface of blades 132, the loaded coating container 110 is heated to a temperature in the range of from about 1040 to about 1125° C. (from about 1904 to about 2057° F.), typically from about 1050 to about 110° C. (from about 1922 to about 2030° F.), more typically from about 1065 to about 1100° C. (about 1949 to about 2012° F.). An inert carrier gas is again flowed into pipe 116 (and out of the outlet holes as gas streams 150) of manifold 118 at a rate in the range of from 0 to about 150 ft.$^3$/hour (0 to about 4248 liters/hour), usually from about 0 to about 80 ft$^3$/hour (0 to about 2265 liters/hour), typically from 0 to about 40 ft$^3$/hour (0 to about 1133 liters/hour), and more typically from 0 to about 20 ft$^3$/hour (0 to about 566 liters/hour). The inert carrier gas commingles and mixes with the aluminide coating gas and acts to aid in the coating of external and internal surfaces of blades 132. The inert carrier gas is flowed into the loaded coating chamber at the above rates for a period of time ranging from about 2 to about 6 hours, typically from about 2.5 to about 5 hours, more typically from about 3 to about 4 hours, while maintaining the loaded coating chamber at a temperature within the above about 1040 to about 1125° C. range.

As the aluminide coating gas flows over the surfaces of blades 132, the aluminide coating gas is reduced to aluminum which is deposited on and diffuses into the substrate, thereby forming an aluminide coating on the external surfaces of blades 132. Within the above time and temperature ranges, the aluminide coating on the external surface of blades 132 typically has a thickness of from about 0.0005 to about 0.004 inches (from about 12.7 to about 101.6 microns), more typically from about 0.0015 to about 0.003 inches (from about 38.1 to about 76.2 microns). Of course, the rate and uniformity of deposition is influenced by the uniformity of the aluminide coating gas environment in proximity to blades 132, as previously discussed. In one embodiment, static coating techniques, in which no inert carrier gas is introduced into coating chamber 124 (i.e., the gas flow rate as described above is 0), are used to deposit an aluminide coating on the external surface of blades 132.

After passing through blades 132, the remaining aluminide coating gas is exhausted from chamber 124 through gas exhaust outlet indicated as 152 and into an open evacuation chamber or area indicated as 160 defined by the extension of side wall 122 beyond base 120. Upon completion of the coating operation to the desired coating thickness, container 110 can be removed from the furnace and cooled or optionally furnace cooled, while maintaining an inert gas atmosphere if desired.

The following examples illustrate some embodiments of this invention, but should not be construed to be any sort of limitation on its scope. In the examples, the test blades were high-pressure gas turbine engine blades made from a single crystal nickel-based superalloy, designated by the trade name René® N5. The blades had an external surface and an internal cooling cavity defined by an internal surface connected to the external surface by cooling holes in the airfoil body portion of the blade.

EXAMPLE 1

A two-step process different from the present invention was used to apply an aluminide coating to sample blades in the coating container shown in FIG. 3. In the first step, argon gas was flowed into the coating container to force aluminide coating vapors, formed by reacting aluminum fluoride activator with chromium aluminum alloy pellets as described regarding FIG. 3, to flow through the cooling holes and internal cooling cavities of the blades and out of the dovetail root holes of the blades. In this reverse flow step, an aluminide coating was deposited on internal surfaces of the blades. The thickness of the internal coating and the aluminum content were controlled by the temperature, gas flow, elapsed time of gas flow, and amount of activator in the coating container. In the second step, the argon gas flow to the coating container was stopped, creating a static environment that primarily affected the external portions of the blades and resulted in the deposition of an aluminide coating on their external surfaces. The thickness of the external coating and the aluminum content were controlled by the temperature, the dwell time at the temperature, and the amount of activator remaining in the coating container after the first step.

The two-step process used 70 grams of aluminum fluoride activator, a coating temperature of about 1975° F. (about 1079° C.) during both steps, argon gas flowing at 120 ft.$^3$/hour (about 3398 liters/hour) for 1 hour during first step, and 5 hours of static dwell during the second step. The aluminide coating deposited on the external surfaces in the airfoil body portion of the blades had a thickness of about 0.002–0.0025 inches (about 50.8–63.5 microns). An aluminide coating having a thickness of from about 0.001–0.0015 inches (about 25.4–38.1 microns) was also formed on internal surfaces of the blades near the leading edge and trailing edge cooling holes. The internal surfaces of the other airfoil body cavities and dovetail cavities were bare.

EXAMPLE 2

Sample blades were coated in the coating container shown in FIG. 3 using a method of the invention. In this method, the coating parameters of Example 1 were altered to deposit a thin, controlled aluminide coating having a thickness of less than 0.0015 inches (about 38.1 microns) on the internal surfaces of all airfoil and dovetail cavities of the blades. In the first step, argon gas was used to flow the aluminide coating vapors through the cooling holes and internal cooling cavities of the blades at a lower temperature. This caused the coating thickness (internal and external) and total aluminum content of the coating to be reduced because of the lower kinetics of diffusion into the substrate. During the second step, the temperature was raised and the gas flow through the internal cooling cavities was reduced to increase the vapor pressure (or activity) of the aluminiding gas and increase the kinetics of aluminum diffusion into the substrate. This resulted in a thicker, higher-aluminum external coating with little or no additional internal coating. The internal and external coating thickness and the aluminum content were thus controlled in both steps by the amount of gas flow, the elapsed time of flow, and the temperature.

This two-step process used 175 grams of aluminum fluoride activator; a coating temperature of about 1650° F. (about 899° C.) and argon gas flowing at 120 ft.$^3$/hour (about 3398 liters/hour) for 4 hours during the first step; and a coating temperature of about 1975° F. (about 1079° C.) and argon gas flowing at 80 ft.$^3$/hour (about 2265 liters/hour) for about 3 hours during the second step. The aluminide coating deposited on the external surfaces in the airfoil body portion of the blades had a thickness of about 0.002–0.0025 inches (about 50.8–63.5 microns). An aluminide coating having a thickness of from about 0.001–0.0015 inches (about 25.4–38.1 microns) was also formed on the internal airfoil body surfaces of the blades. An aluminide coating having a thickness of from about 0.0005–0.0015 inches (about 12.7–38.1 microns) was also formed on the internal surfaces of the dovetail cavities (i.e., the root portions) of the blades.

Various embodiments of this invention have been described. However, this disclosure should not be deemed to be a limitation on the scope of the invention. Accordingly, various modifications, adaptations, and alternatives may occur to one skilled in the art without departing from the spirit and scope of the claimed invention.

What is claimed is:

1. A method for applying an aluminide coating on a gas turbine engine blade having an external surface and an internal cooling cavity defined by an internal surface that is connected to the external surface by cooling holes, the method being conducted in a vapor coating container having a hollow interior coating chamber, the method comprising the steps of:

(a) loading the coating chamber with the blade to be coated;

(b) providing an aluminide coating gas in the loaded coating chamber;

(c) flowing an inert carrier gas into the loaded coating chamber comprising the aluminide coating gas at a gas flow rate of from about 60 to about 150 ft.$^3$/hour (from about 1699 to about 4248 liters/hour) for from about 2 to about 6 hours to move the aluminide coating gas through the cooling holes and internal cooling cavity of the blade, while maintaining the loaded coating chamber at a temperature of from about 815 to about 980° C., to deposit an aluminide coating on the internal surface of the blade; and then (d) flowing an inert carrier gas into the loaded coating chamber comprising the aluminide coating gas at a gas flow rate of from 0 to about 150 ft.$^3$/hour (from 0 to about 4248 liters/hour) for from about 2 to about 6 hours, while maintaining the loaded coating chamber at a temperature of from about 1040 to about 1125° C., to deposit an aluminide coating on the external surface of the blade.

2. The method of claim 1 comprising the further step of loading the coating chamber with an aluminum source that generates the aluminide coating gas of step (b) in the coating chamber.

3. The method of claim 1 wherein the aluminide coating gas is formed by reacting an aluminum source with a halide activator.

4. The method of claim 3 wherein the halide activator is selected from the group consisting of aluminum chloride, aluminum fluoride, aluminum bromide, ammonium chloride, ammonium fluoride, ammonium bromide, hydrogen chloride, and mixtures thereof.

5. The method of claim 1 wherein during step (c) the loaded coating chamber comprising the aluminide coating gas is maintained at a temperature of from about 850 to about 950° C. for from about 3 to about 5 hours.

6. The method of claim 5 wherein the temperature during step (c) is from about 880 to about 920° C.

7. The method of claim 1 wherein the gas flow rate during step (c) is in the range of from about 80 to about 140 ft$^3$/hour (about 2265 to about 3964 liters/hour).

8. The method of claim 7 wherein the gas flow rate during step (c) is in the range of from about 100 to about 130 ft$^3$/hour (about 2832 to about 3681 liters/hour), and the temperature during step (c) is from about 880 to about 920° C.

9. The method of claim 8 wherein the carrier gas is argon or hydrogen.

10. The method of claim 1 wherein during step (d) the inert carrier gas is flowed into the coating chamber at a gas flow rate of from 0 to about 80 ft$^3$/hour (from 0 to about 2265 liters/hour) for from about 2.5 to about 5 hours.

11. The method of claim 10 wherein the temperature during step (d) is from about 1050 to about 1110° C.

12. The method of claim 11 wherein the temperature during step (d) is from about 1065 to about 1100° C.

13. The method of claim 12 wherein during step (c) the loaded coating chamber comprising the aluminide coating gas is maintained at a temperature of from about 850 to about 950° C. for from about 3 to about 5 hours.

14. The method of claim 1 wherein the turbine engine blade has an airfoil body portion and an airfoil root portion, and the aluminide coating on the internal surface of the blade is less than about 0.003 inches (less than about 76.2 microns) thick in the airfoil body portion and less than about 0.0015 inches (less than about 38.1 microns) thick in the root portion.

15. The method of claim 14 wherein the aluminide coating on the external surface of the blade is from about 0.0015 to about 0.003 inches (from about 38.1 to about 76.2 microns) thick in the airfoil body portion.

16. The method of claim 15 wherein the temperature during step (c) is maintained at from about 850 to about 950° C. for from about 3 to about 5 hours, and the temperature during step (d) is maintained at from about 1050 to about 1100° C. for from about 2.5 to about 5 hours.

17. The method of claim 16 wherein the gas flow rate during step (c) is from about 100 to about 130 ft$^3$/hour (from about 2832 to about 3681 liters/hour) and the gas flow rate during step (d) is from 0 to about 20 ft$^3$/hour (from 0 to about 566 liters/hour).

18. The method of claim 17 wherein the carrier gas is argon or hydrogen.

19. A method for applying an aluminide coating on a gas turbine engine blade having an external surface and an internal cooling cavity defined by an internal surface that is connected to the external surface by cooling boles, the method being conducted in a vapor coating container having a hollow interior coating chamber, the method comprising the steps of:

(a) loading the coating chamber with the blade to be coated;

(b) providing an aluminide coating gas in the loaded coating chamber;

(c) flowing an inert carrier gas into the loaded coating chamber comprising the aluminide coating gas at a gas flow rate of from about 80 to about 140 ft.$^3$/hour (from about 2265 to about 3964 liters/hour) for from about 3 to about 5 hours to move the aluminide coating gas through the cooling holes and internal cooling cavity of the blade, while maintaining the loaded coating chamber at a temperature of front about 850 to about 950° C., to deposit an aluminide coating having a thickness of from about 0.0005 to about 0.0015 inches (from about 12.7 to about 38.1 microns) on the internal surface of the blade; and then (d) flowing an inert carrier gas into the loaded coating chamber comprising the aluminide coating gas at a gas flow rate of from 0 to about 80 ft.$^3$/hour (from 0 to about 2265 liters/hour) for from about 2.5 to about 5 hours, while maintaining the loaded coating chamber at a temperature of from about 1050 to about 1110° C., to deposit an aluminide coating, having a thickness of from about 0.0015 to about 0.003 inches (from about 38.1 to about 76.2 microns), on the external surface of the blade in the airfoil body portion.

20. The method of claim 19 wherein the aluminide coating gas is formed by reacting an aluminum source with a halide activator.

21. The method of claim 20 wherein the halide activator is selected from the group consisting of aluminum chloride, aluminum fluoride, aluminum bromide, ammonium chloride, ammonium fluoride, ammonium bromide, hydrogen chloride, and mixtures thereof.

22. The method of claim 19 wherein, during step (c), the loaded coating chamber comprising the aluminide coating gas is maintained at a temperature of from about 880 to about 920° C.

23. The method of claim 19 wherein, during step (d), the loaded coating chamber comprising the aluminide coating gas is maintained at a temperature of from about 1065 to about 1100° C.

24. The method of claim 19 wherein the gas flow rate during step (c) is in the range of from about 100 to about 130 ft$^3$/hour (from about 2832 to about 3681 liters/hour).

25. The method of claim 24 wherein the gas flaw rate during step (d) is in the range of from 0 to about 20 ft$^3$/ hour (0 to about 566 liters/hour).

26. The method of claim 25 wherein the carrier gas is argon or hydrogen.

27. The method of claim 26 wherein the aluminide coating gas is formed by reacting an aluminum source with a halide activator.

28. The method of claim 27 wherein the halide activator is selected from the group consisting of aluminum chloride, aluminum fluoride, aluminum bromide, ammonium chloride, ammonium fluoride, ammonium bromide, hydrogen chloride, and mixtures thereof.

29. The method of claim 28 wherein, during step (c), the loaded coating chamber comprising the aluminide coating gas is maintained at a temperature of from about 880 to about 920° C. for from about 3.5 to about 4.5 hours.

30. The method of claim 29 wherein, during step (d), the loaded coating chamber comprising the aluminide coating gas is maintained at a temperature of from about 1065 to about 1100° C. for from about 3 to about 4 hours.

* * * * *

UNITED STATES PATENT AND TRADEMARK OFFICE
CERTIFICATE OF CORRECTION

PATENT NO.  : 6,929,825 B2
DATED       : August 16, 2005
INVENTOR(S) : Wustman et al.

It is certified that error appears in the above-identified patent and that said Letters Patent is hereby corrected as shown below:

Column 8,
Line 31, delete "110ºC" and insert -- 1110ºC --.

Column 11,
Line 51, delete "1100ºC" and insert -- 1110ºC --.

Column 12,
Line 10, delete "front" and insert -- from --.
Line 45, delete "flaw" and insert -- flow --.

Signed and Sealed this

Seventeenth Day of January, 2006

JON W. DUDAS
*Director of the United States Patent and Trademark Office*